3,502,602
SOLUBLE UNSATURATED POLYESTER AMIDE
RESINS
Dietrich Helm, Unna, and Rainer Janssen, Kamen,
Germany, assignors to Schering AG, Berlin,
Germany
No Drawing. Filed Dec. 11, 1967, Ser. No. 689,286
Claims priority, application Germany, Dec. 13, 1966,
Sch 39,954; Oct. 28, 1967, Sch 41,488
Int. Cl. C08g 20/30, 20/26
U.S. Cl. 260—22                                   12 Claims

ABSTRACT OF THE DISCLOSURE

Unsaturated polyester-amide resins, soluble in organic solvents, comprising condensation products of (A) a polymeric fatty acid and/or an ester thereof and/or a high molecular weight branched polycarboxylic acid having at least 12 carbon atoms and/or an ester thereof with (B) a difunctional compound containing hydroxy and amino groups, e.g. an alkanolamine or a mixture of an aliphatic or cycloaliphatic diamine and a dihydroxy alcohol, into which condensation products (C) maleic acid is terminally introduced; a method for making said resins; hardenable compositions containing said resins together with vinyl compounds.

---

The present invention relates to unsaturated polyester-amide resins soluble not only in alcohols or phenols, but also in a number of other solvents such as ketones, esters, and aromatic and cycloaliphatic hydrocarbons; to methods of making the resins; and to hardenable compositions comprising the resins as a component thereof.

The unsaturated polyester-amide resins according to the invention are condensation products of (A) a polymeric fatty acid or an ester thereof and/or a higher molecular weight branched polycarboxylic acid having at least 12 carbon atoms or an ester thereof, with (B) a difunctional compound containing hydroxy and amino groups, e.g. an alkanolamine or a mixture of an aliphatic diamine and a dihydroxy alcohol wherein the ratio of the sum of equivalents of hydroxy groups and amino groups to that of the carboxy groups of the polymeric fatty acid and/or the higher molecular weight branched polycarboxylic acid is between 1.2:1 and 2:1. The resin further comprises (C) terminal maleic acid groups. Suitable high molecular weight polycarboxylic acids include adducts or copolymers of unsaturated fatty acids with $\alpha,\beta$-unsaturated mono- or di-carboxylic acids, and carboxystearic, carboxymethylstearic, and carboxyethylstearic acids of the formula

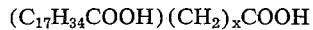

$$(C_{17}H_{34}COOH)(CH_2)_xCOOH$$

wherein $x$ is 0, 1, or 2. Suitable alkanolamines are those having alkylene radicals, which may be branched, of from 2 to 10 carbon atoms and primary amino groups or secondary amino groups having N-alkyl substituents with up to 4 carbon atoms. Additional aliphatic diamines, preferably branched aliphatic diamines with primary or secondary amino groups, and/or dihydroxy alcohols may optionally be combined with said alkanolamines. Mixtures of the same diamines and dihydroxy compounds can be used in place of alkanolamines.

Hardenable compositions which are hardened by the addition of free radical forming catalysts thereto, particularly organic peroxides, comprise unsaturated polyesteramide resins of the type described above and vinyl compounds, together with optional further comonomers as well as optional fillers and other conventional additives.

The unsaturated polyester-amide resins of the invention are prepared by condensing (A) a polymeric fatty acid and/or an ester thereof and/or a high molecular weight branched polycarboxylic acid having at least 12 carbon atoms and/or an ester thereof with (B) a difunctional compound containing hydroxy groups and amino groups at an elevated temperature, the ratio of the sum of equivalents of hydroxy groups and amino groups to carboxyl groups being between 1.2:1 and 2:1, and subsequently adding (C) maleic acid anhydride to unreacted hydroxyl and amino groups which may still be present.

Polyamide condensation products comprising short chain dicarboxylic acids, such as maleic acid and its derivatives, have the disadvantage of showing little or no solubility in common solvents. Therefore, it could not have been foreseen by one skilled in the art that the unsaturated polyester-amide resins of the present invention would possess such good solubility properties.

It is further generally known that aliphatic amino groups very easily add to the double bonds of $\alpha,\beta$-unsaturated carboxylic acids. Because of this disruptive side reaction, the use of aliphatic compounds containing amino groups for polycondensation reactions with maleic acid or its derivatives did not appear possible if the double bond of the maleic acid was to remain intact.

It is further known that the formation of imides can disrupt the polycondensation of maleic acid or of its derivatives with compounds containing amino groups.

The unsaturated polyester-amide resins of the invention—independent of whatever specific structure they may have—show good solubility up to high concentrations in the most different solvents, and particularly in purely aromatic solvents. Therefore, the term "soluble" is applied in this specification not only to resins forming solutions which are gel-like, but include those forming solutions which are fluid at room temperature.

With an unsaturated polyester-amide resin according to the invention comprising about 12 percent of maleic acid and in which the ratio of equivalents of amide bonds to ester bonds is about 2:1, it is even possible to prepare fluid solutions of 700 percent or even 80 percent concentration in toluene or, of particular interest, in styrene. In order to obtain such an extreme solubility, certain measures described more in detail below must be observed. However, for many fields of use, particularly for impregnation and coating, a solubility of 20 percent or even less is quite suitable.

Hardenable compositions containing a polyesteramide resin according to the present invention can contain as comonomers vinyl aromatic compounds such as styrene divinylbenzene or chlorostyrene, acryl monomers such as the methacrylates and acrylates, allyl esters, and/or other olefinically unsaturated compounds conventionally employed in the preparation of unsaturated polyester resins, or mixtures thereof. These compositions can be hardened at room temperature or elevated temperature after the addition thereto of free radical-forming materials, particularly organic peroxides, optionally together with accelerators. These compositions are suitable for the coating of surfaces and the formation of laminates, as casting resins, patching compounds, adhesives, and the like.

The fatty acids used in the present invention are polymers of mono- and poly-unsaturated fatty acids. Polymerization may be carried out according to various methods, including thermally or with catalysts, for example catalytically active clays or free radical formers, as illustrated in the following U.S. patents: 2,482,761; 2,731,481; 2,347,562; 2,793,219; 2,793,220; 2,955,121; 3,059,003; 3,100,784; and 3,157,681.

The term "polymeric fatty acids" as used herein includes homo-polymeric fatty acids as well as co-polymeric fatty acids, i.e. polycarboxylic acids in which two or more fatty acid molecules are directly linked, or are joined by co-components as bridging members, or are bound in some other fashion to such co-components. Conventional polymerizable comonomers are employed as co-components for the copolymerization of fatty acids, for example aromatic vinyl compounds such as styrene. Suitable copolymerization processes are taught, for example, in U.S. Patent 3,271,432 and Belgian Patent 627,128.

To prepare the polyester amide resins of the invention, polymeric fatty acids can be employed which, in addition to the dicarboxylic acids which are formed in major portion during polymerization, also contain higher functional as well as mono-functional carboxylic acids. Optionally, mono-functional carboxylic acids can be partially or completely distilled from crude polymeric fatty acids, or pure dicarboxylic acids can be obtained by distillation. It is also possible to saturate the polymeric fatty acids to a greater or lesser extent by hydrogenation. In place of free polymeric fatty acids, their esters, particularly their esters with mono-hydroxy alcohols having 1 to 4 carbon atoms can be employed.

High molecular weight branched polycarboxylic acids are obtainable as follows. Adducts or copolymers of unsaturated fatty acids with α,β-unsaturated mono- or dicarboxylic acids can be prepared from simple unsaturated fatty acids, such as oleic acid, and α,β-unsaturated carboxylic acids, such as maleic acid or maleic acid anhydride, with or without catalysts, by heating in a sort of substituting addition, for example according to U.S. Patents 2,188,882; 2,560,595; 2,598,634; etc. When polyunsautrated fatty acids and, particularly, when trans-transconjugated fatty acids are employed, the reaction generally follows a Diels-Alder addition. The preferred α,β-unsaturated carboxylic acids for adducts of this type are maleic acid or maleic acid anhydride and acrylic acid or acrylic acid esters.

All the adducts or copolymers can be used in the form of free acids or as their lower alkyl esters in preparing the polyester amides of the invention. Further, they can be hydrogenated in order to improve their color or their stability to light, oxidation, and heat. Mono-functional fatty acids not involved in adduct formation can be separated to a greater or lesser extent.

Carboxystearic acids and their lower alkyl esters can be obtained in various ways. The most common are the Koch syntheses from oleic acid, carbon dioxide, and water in the presence of Lewis acid catalysts [Brennstoff-Chemie, 36, 321–328 (1955)] and the synthesis of Reppe in which nickel carbonyl is employed as a transfer agent (German patent publications 861,243; 868,149; 1,006,-849). Carboxymethylstearic acid and its esters can be prepared from oleic acid or oleic acid esters by the addition of acetic acid or acetic acid anhydride [E. Roe et al., J. Am. Oil Chem. Soc., 42, 457–461 (1965)].

Polymeric fatty acids or the above-described polycarboxylic acids, or mixtures thereof, all can be employed in the resins according to the present invention. Additionally, small amounts of short-chain saturated linear or branched aliphatic, cycloaliphatic, and aromatic dicarboxylic acids such as adipic acid, azaleic acid, sebacic acid, dimethyl adipic acid, trimethyl adipic acid, hexahydrophthalic acid, tetrahydrophthalic acid, o-phthalic acid, iso-phthalic acid, and terephthalic acid can be condensed into the polyamide resins although the solubility of the resins in many cases decreases with increasing amounts of these acids.

Depending on the other starting materials, and particularly on the diamines employed and the solubility desired in the end product, the amount of short-chain dicarboxylic acids of this type can be up to 40 equivalent percent, calculated on the total polycarboxylic acid content with the exception of the terminal maleic acid.

Suitable alkanolamines having primary or secondary amino groups are, for example, monoethanolamine, propanolamine, isopropanolamine, N - monoalkylalkanolamines such as N-methyl ethanolamine, and mixtures thereof. For economic reasons, monoethanolamine is preferred. Monoamines having two hydroxy groups, such as diethanolamine, can be co-employed in small amounts.

The alkanolamines mentioned can be used alone as the component containing hydroxy- and amino-groups. However, they can also be combined with aliphatic diamines and/or dihydroxy alcohols or replaced entirely by mixtures of primary or secondary aliphatic diamines and dihydroxy alcohols. As such alcohols generally all those are suitable which can be used for the preparation of conventional unsaturated polyester resins, for example alkylene glycols such as ethylene glycol and propylene glycol, butane diol, hexane diol, neopentyl glycol, and higher linear or branched chain dialcohols including, for example, dimeric fatty alcohols (diols prepared from dimeric fatty acids).

Further suitable dihydroxy alcohols are those whose alkylene chains are interrupted by ether bridges, such as in the polyglycols like diethylene glycol, dipropylene glycol, or dibutylene glycol, or are interrupted by cycloaliphatic rings as in 1,4-dimethylol cyclohexane, or by aromatic rings as in bis-(hydroxy-ethoxy-phenyl)-propane or 1,4-di-(hydroxy-ethoxy)benzene.

Suitable diamines having primary or secondary amino groups are, for example: ethylene diamine; 1,2- and 1,3-propylene diamine; 1,4-diamino butane; 1,3-diamino butane, diamine hexanes; 2,4,4- and 2,2,4-trimethyl hexamethylene diamine; 2-phenyl-1,5-diamino pentane; 9- or 10-amino stearyl amine; diamines of dimeric fatty acids; diamines having alkyl substituents on one or both nitrogen atoms such as N-ethyl ethylene diamine, N-methyl propane diamine, N-butyl propane diamine, and N.N'-dimethyl propane diamine; cyclic secondary diamines such as dipiperidyl propane; and cycloaliphatic diamines such as 3-aminomethyl-3,5,5-trimethyl cyclohexyl-amine and bis-(amino-methyl-cyclohexyl)-methane.

The diamines may also have one or more ether groups. Exemplary of such materials are: di-(aminopropyl)-ether; α,ω-diamino-4,7-dioxadecane; α,ω-diamino - 4,9 - dioxadodecane; 1,4 - di - (amino-n-propoxymethyl) - cyclohexane; the ether diamine formed by cyanoethylation and hydrogenation of dimeric fatty alcohols; and the like. In addition to two primary or secondary amino groups, the amine may also contain additional tertiary amino groups, as is the case for amino ethyl piperazine, for example.

If linear di-primary diamines are employed according to the process of the invention, the ratio of equivalents of the total hydroxy groups to the amino groups should preferably be at least 1:1 in order to obtain suitable solubility at room temperature. With an increasing degree of substitution of the diamines and/or increasing size of the substituted alkyl radical, this equivalence ratio can be decreased. For the majority of the above-mentioned diamines, it may be less than 1:1. It can further be lower for linear diprimary diamines if gel-like or thixotropic solutions are desired at room temperature.

If high molecular weight diamines, such as the diamines of dimeric fatty acids, or high molecular weight divalent alcohols, such as the diols of dimeric fatty acids, are employed, they are suitably used in combination with lower molecular weight divalent alcohols or diamines respectively.

In the preparation of unsaturated soluble polyester amide resins according to the invention, dimeric or polymeric fatty acids and/or high molecular weight branched polycarboxylic acids are reacted with difunctional compounds containing hydroxy and amino groups in a first reaction step, with removal of water, to form a polyester amide resin containing hydroxy groups and, possibly, amino groups. The ratio of the sum of hydroxy and primary or secondary amino groups to carboxy groups in the starting materials used in this first step should be between 1.2:1 and 2:1. The ratio of amino groups to carboxy groups preferably should not exceed 1:1, but can be higher in certain cases.

In general, temperatures up to about 250° C. can be used. However, in certain cases, particularly when alkanolamines are used, it is suitable to limit the polycondensation temperature to about 170° C.–180° C. in order to avoid undesirable side reactions. To accelerate and complete the reaction, a vacuum may be employed.

In a second reaction step, maleic acid anhydride is added to unreacted hydroxy and amino terminal groups, employing 0.5 to 1 mol of maleic acid anhydride per equivalent of reactable end groups. In general, this second step of the process according to the invention is carried out at a temperature between about 50° C.–140° C. The speed of the addition is dependent upon the hydroxy number of the polycondensation product: low hydroxy numbers require higher addition temperatures as well as longer addition times. In order to assume complete addition, analysis of the reaction mixture to determine whether free maleic acid is still present in the reaction mixture is suitable. The addition can be carried out in a melt, or in the presence of solvents which are inert to the reactants.

When the addition takes place in the upper portions of the temperature region set forth above, structures may be produced which positively influence the rate of gelation and rate of hardening in the copolymerization of the unsaturated polyester amide resins of the invention with olefinic unsaturated compounds such as styrene in the presence of organic peroxides.

The unsaturated polyester-amide resins according to the invention can be copolymerized by free radicals with comonomers conventionally employed in the unsaturated polyester field to form hard to tough-flexible resins. Suitable free radical-forming catalysts are, particularly, the known organic peroxides such as benzoyl peroxide, di-t-butyl peroxide, lauroyl peroxide, t-butyl perbenzoate, t-butyl hydroperoxide, cumol hydroperoxide, cyclohexanone peroxide, and methyl ethyl ketone peroxide, or mixtures thereof. The usual accelerators, such as tertiary amines or the cobalt or vanadium salts or organic acids, can be employed in combination with these peroxides, optionally together with mercaptans such as lauryl mercaptan, diketones such as acetyl acetone, and the like. The unsaturated polyester amide resins according to the invention, dissolved in comonomers, can also be combined before hardening with fillers or pigments and, particularly, with glass fibers, in order to modify their working properties or their utility.

A better understanding of the present invention and of its many advantages will be had by referring to the following specific examples, given by way of illustration, in which the commercial dimeric fatty acids employed are dimeric tall oil fatty acids.

EXAMPLE 1

1000 grams of a commercial dimeric fatty acid (containing about 10 percent monomer and about 16 percent trimer), 127.3 grams of ethanolamine, and 0.05 gram $H_3PO_4$ were heated to 150° C. under a nitrogen atmosphere in a reaction vessel provided with a stirrer, a descending column, and a receiver, with distillative removal of the water of reaction. The reaction mixture was held for four hours at 150° C. then slowly heated to 180° C. and kept at this temperature for 8 hours, a vacuum of about 70 mm./Hg being applied for the last 10 minutes. The reaction product had the following characteristics: hydroxy number=37.7; acid number=2.3; amine number=0.2.

0.3 gram of t-butyl pyrocatechol and 66.5 grams of maleic acid anhydride were added to the reaction product at 100° C. and the mixture was stirred for one hour at 100° C. The unsaturated polyester amide obtained is an amber-colored resin of high viscosity at room temperature. Its content of olefinic unsaturations derived from maleic acid is 0.06 equivalent per 100 grams of resin. The resin is soluble, for example, in benzene, toluene, styrene, benzene/isopropanol 1:1, isopropanol, methyl isobutyl ketone, ethyl acetate, methyl methacrylate, dioxane, ethyl Cellosolve, cyclohexane, and the like, i.e. 50 percent solutions of the polymer in the solvents were stable at room temperature.

EXAMPLE 2

As in Example 1, 627 grams of commercial dimeric fatty acid, 0.031 gram of $H_3PO_4$, and 134.2 grams of ethanolamine were heated for three hours at 150° C. and for three hours at 180° C. with distillative removal of the water of reaction, with application during the last hour of a vacuum of about 70 mm./Hg. The reaction product had an hydroxy number of 156, an acid number of 0.5, and an amine number of 5.5. 0.6 gram of t-butyl pyrocatechol and 187 grams of maleic acid anhydride were added to the reaction product at 80° C. and the mixture was stirred for one hour at 80° C. The unsaturated polyester amide produced is a tough fluid resin. The content of olefinic double bonds derived from maleic acid is 0.21 equivalent per 100 grams of resin.

The addition of maleic acid anhydride can take place at 140° C. under a vacuum of about 70 mm./Hg, instead of at 80° C.

Both types of product are soluble in the solvents mentioned in Example 1.

EXAMPLE 3

As in Example 1, 885 grams of dimeric fatty acid, 62.2 grams of ethylene diamine, 109.8 grams of diethylene glycol, and 0.035 gram of $H_3PO_4$ were heated to 220° C. over a period of 6 hours, with distillative removal of the water of reaction, and held at this temperature for 7 hours. During a final 15-minute period, a vacuum of about 70 mm./Hg was applied. The reaction product had an hydroxy number of 54, an acid number of 4.1, and an amine number of 2.7.

0.3 gram of t-butyl pyrocatechol and 94 grams of maleic acid anhydride were added at 90° C. and stirred for two hours at 90° C. The unsaturated polyester amide produced is a soft thermoplastic resin having a content of double bonds derived from maleic acid of 0.12 equivalent per 100 grams of resin. The resin is soluble in the same solvents mentioned in Examples 1 and 2.

EXAMPLE 4

As in Example 1, 1140 grams of a commercial dimeric fatty acid, 0.57 gram of $H_3PO_4$, 158 grams of a technical mixture of isomeric trimethyl hexamethylene diamines and 122 grams of ethanolamine were heated for 2 hours at 150° C. and, subsequently, for three hours at 170° C.– 180° C., with distillative removal of the water of reaction, whereupon a vacuum of about 50 mm./Hg was applied for a 15-minute period. The reaction product had an hydroxy number of 86, an acid number of 2.3, and an amine number of 6.3.

205 grams of maleic acid anhydride and 0.35 gram of t-butyl pyrocatechol were now added at 90° C. and stirred for one hour at 90° C. The unsaturated polyester amide obtained is a soft thermoplastic material with a double bond content derived from maleic acid of 0.14 equivalent per 100 grams of resin. The resin is highly soluble in the same solvents mentioned in Example 1–3.

EXAMPLE 5

114 grams of a commercial dimeric fatty acid, 15.8 grams of a mixture of 2,2,4-trimethyl hexamethylene diamine and the 2,4,4-isomer, 68.4 grams of bis-oxyethyl bis-phenol, and 0.006 gram of $H_3PO_4$ were heated as in Example 1 for two hours at 140° C. and for 8 hours at 200° C.–230° C. during which the water of reaction was continuously removed by distillation. Toward the end, a vacuum of about 60 mm./Hg was applied for a period of five minutes. The product obtained had the following characteristics: hydroxy number=53; acid number=4; amine number=1.

0.22 gram of hydroquinone and 16.7 grams of maleic acid anhydride were added to the reaction product at 90° C. and stirred for one hour at 90° C.–100° C. The unsaturated polyester amide produced is a soft resin having a maleic acid derived-double bond content of 0.077 equivalent per 100 grams of resin. Again, the resin product is soluble in materials such as benzene, toluene, styrene, ethanol, isopropanol, acetone, methyl isobutyl ketone, ethyl acetate, methyl methacrylate, dioxane, ethyl Cellosolve, cyclohexane, etc.

EXAMPLE 6

380 grams of a commercial dimeric fatty acid, 0.02 gram of $H_3PO_4$, 80.2 grams of bis-(amino-methylcyclohexyl)-methane, and 70.7 grams of neopentyl glycol were heated as in Example 1 for five hours at 140° C.–160° C. and for eight hours at 220° C.–230° C. with distillative removal of the water of reaction, and with application of a vacuum of about 60 mm./Hg toward the end of the reaction. The reaction product had the following values: hydroxy number=64; acid number=3.1; amine number=1.3.

0.1 gram of t-butyl pyrocatechol and 54 grams of maleic acid anhydride were added to the reaction product at 140° C. and the mixture was stirred for ½ hour at this temperature. The unsaturated polyester amide resin obtained is a highly viscous resin having a double bond content, derived from maleic acid, of 0.1 equivalent per 100 grams of resin. The resin is soluble in solvents like those mentioned in Example 5.

EXAMPLE 7

As in Example 1, 180 grams of commercial dimeric tall oil fatty acid, 0.01 gram of phosphoric acid, 50 grams of ethanolamine, and 20 grams of adipic acid were heated at 150° C. for three hours, and subsequently for nine hours at 180° C. Thereafter, a vacuum of 60–70 mm./Hg was applied for fifteen minutes. The reaction product had an hydroxy number of 169, an amine number of 4.8, and an acid number of 0.9.

0.2 gram of t-butyl pyrocatechol was added as a stabilizer to 172 grams of the product, and 48 grams of maleic acid anhydride were subsequently added to about 90° C. After maintaining the temperature for one hour at 90° C.–100° C., a tough resin is obtained on cooling to room temperature. The resin is soluble in benzene, ethanol, isopropanol, methyl isobutyl ketone, dioxane, ethyl acetate, and styrene. The resin content of olefinic double bonds stemming from maleic acid is about 0.22 equivalent per 100 grams of resin.

EXAMPLE 8

In a reaction vessel provided with a stirrer, a descending column, and a receiver, 196 grams of a 95 percent distilled adduct, prepared from 1 mol of maleic acid anhydride and a mol of conjugated linoleic acid methyl esters obtained by isomerization, were heated under a nitrogen atmosphere with 29 grams of hexamethylene diamine and 42 grams of diethylene glycol at 160° C. Subsequently, the mixture was first heated for three hours at 160° C. and then for 8½ hours at 230° C. After this period, a vacuum of 60–70 mm./Hg was applied for one hour. The reaction product had the following properties: hydroxy number=77.4; acid number=2.8; amine number=0.

0.122 gram of t-butyl pyrocatechol was added to 60° C.–70° C. to 229 grams of the reaction product, and 31 grams of maleic acid anhydride were then added with stirring. Subsequently, the mixture was stirred for a further hour at 90° C.–100° C. At room temperature, a tough resin having a content of olefinic bonds derived from maleic acid anhydride (unsaturation number) of 0.122 equivalent per 100 grams was obtained. The resin is soluble in benzene, toluene, styrene, ethanol, methyl isobutyl ketone and the like.

EXAMPLE 9

As in Example 8, 200 grams of a $C_{19}$-dicarboxylic acid prepared in known fashion by carboxylation of oleic acid with the aid of nickel carbonyl, were heated with 60 grams of ethanolamine to 150° C. over a period of 20 minutes and then kept for 15 hours at 180° C. After this time, a vacuum of 60–70 mm./Hg was applied for one hour. The reaction product had the following characteristics: hydroxy number=138; acid number=1.6; amine number=9.6.

217 grams of this product were stabilized with 0.212 gram of t-butyl pyrocatechol and 50 grams of maleic acid anhydride were added with stirring. Subsequently, the mixture was stirred for one hour at 90° C.–100° C. At room temperature a tough resin was obtained having an unsaturation number of 0.191. The resin was soluble in benzene, ethanol, isopropanol, methyl isobutyl ketone, dioxane, styrene, and the like.

EXAMPLE 10

In the same manner as in Example 8, 133 grams of a $C_{19}$-dicarboxylic acid like that used in Example 9 were heated with 47 grams of an isomeric mixture of 2,2,4- and 2,4,4-trimethyl hexamethylene diamines, and with 21 grams of diethylene glycol at 180° C. for four hours, and then held for 22 hours at 230° C. After an hour-long application of a vacuum of 60–70 mm./Hg, a reaction product having the following properties was obtained: hydroxy number=45; acid number=5.9; amine number=1.4.

166 grams of the reaction product were stabilized with 0.057 gram of t-butyl pyrocatechol, after which 14 grams of maleic acid anhydride were added at a temperature of 60–70° C. with stirring. The mixture was subsequently stirred for one hour at 90–100° C. At room temperature a tough resin is obtained which is soluble in benzene, styrene, ethanol, methyl isobutyl ketone and the like, and which has an unsaturation number of 0.079.

EXAMPLE 11

In the same fashion as in Example 8, 200 grams of an oleic acid-maleic acid adduct (acid number in pyridine=367), 38 grams of 1,12-diamino-4,9-dioxadodecane, and 37 grams of ethanolamine were slowly heated at 180° C. and maintained for 8 hours at 180° C. After application of a vacuum for one hour at 60–70 mm./Hg, a reaction product having the following properties was obtained: hydroxy number=120; acid number=0.5; amine number=7.

231 grams of the reaction product obtained were stabilized with 0.2 grams of t-butyl pyrocatechol and then combined with 48 grams of maleic acid anhydride at 70° C. with stirring. Subsequently, the mixture was heated for 1 hour at 100° C. In this manner, a viscous resin having an unsaturation number of 0.176 was obtained. The resin is soluble in benzene, styrene, ethanol, isopropanol, methyl butyl ketone, and the like.

EXAMPLE 12

300 grams of a 95 percent distilled fatty acid-maleic acid-adduct of the type shown in Example 8 were heated to 180° C. as in Example 8 with 57 grams of an isomeric mixture of 2,2,4- and 2,4,4-trimethyl hexamethylene diamine and 45 grams of ethanolamine and maintained at this temperature for 10 hours. In this manner, a reaction product having an hydroxy number of 98 and an amine number of 9 is obtained.

0.230 gram of t-butyl pyrocatechol is first added to 330 grams of this reaction product, and then 58 grams of maleic acid anhydride are added with stirring. The mixture is then heated for one hour at 100° C. A tough resin having an unsaturation value of 0.156 is obtained. The resin is soluble in benzene, styrene, ethanol, isopropanol, methyl isobutyl ketone, and the like.

EXAMPLE 13

As in Example 8, 200 grams of a fatty acid-maleic acid adduct were heated to 180° C. with 49 grams of ethanolamine (mol ratio 2:3) and held at this temperature for seven hours. A reaction product having the following characteristics was obtained: hydroxy number=139; acid number=0.8; amine number=1.2.

0.2 gram of t-butyl pyrocatechol was added to 213 grams of the product for stabilization, and 50 grams of maleic acid anhydride were then added with stirring. After further stirring for an hour at 90°–100° C., and cooling to room temperature, a tough resin having an unsaturation value of 0.194 equivalent per 100 grams was obtained. The resin is soluble in benzene, styrene, ethanol, isopropanol, methyl isobutyl ketone, and the like.

The unsaturated polyester amide resins prepared in Examples 1–6 herein were dissolved in styrene to give a 60 percent solution and were hardened with 2 percent of a 75 percent t-butyl-hydroperoxide solution and 1 percent of a conventional vanadium accelerator at room temperature, to form materials having the properties given in Table I (measured after 14 days). The unsaturated polyester amide resins of Examples 7–13 were dissolved in styrene to form 70 percent solutions and hardened for two hours at 120° C. with 2 percent of a 50 percent solution of t-butyl perbenzoate in dimethyl phthalate.

TABLE I

| Example | Tensile strength (kg./cm.$^2$) | Extension at break (percent) |
|---|---|---|
| 1 | 155 | 150 |
| 2 | 405 | <10 |
| 3 | 175 | 130 |
| 4 | 350 | <10 |
| 5 | 360 | 16 |
| 6 | 380 | 35 |
| 7 | 526 | 7 |
| 8 | 71 | 75 |
| 9 | 539 | 5 |
| 10 | 123 | 120 |
| 11 [1] | 525 | 5 |
| 12 | 514 | 6 |
| 13 | 437 | 7 |

[1] 60 percent in styrene.

The hardened styrene solutions of the unsaturated polyester amide resins of the invention are extraordinarily resistant to hydrolysis by water and aqueous acids.

What is claimed is:

1. An unsaturated polyester-amide resin condensation product of (A) an acid component selected from the group consisting of (1) a polymeric fatty acid and esters thereof, (2) a high molecular weight branched polycarboxylic acid having at least 12 carbon atoms and esters thereof, and (3) mixtures of (1) and (2), with (B) a difunctional component having hydroxy and amino groups and selected from the group consisting of (1) an alkanolamine and (2) a mixture of an aliphatic or cycloaliphatic diamine and a dihydroxy alcohol, in which condensation product the ratio of equivalents of hydroxy and amino groups in said difunctional component to carboxyl groups in said acid component is between 1.2:1 and 2:1, said condensation product further having (C) terminally positioned maleic acid groups.

2. An unsaturated polyester-amide resin condensation product as in claim 1 wherein said high molecular weight branched polycarboxylic acid is an adduct or copolymer of an unsaturated fatty acid and an α,β-unsaturated mono- or di-carboxylic acid, or an ester of such an adduct or copolymer.

3. An unsaturated polyester-amide resin condensation product as in claim 1 wherein said high molecular weight branched polycarboxylic acid is a carboxystearic acid, carboxymethylstearic acid, or carboxyethyl-stearic acid of the formula $$(C_{17}H_{34}COOH)(CH_2)_xCOOH$$

wherein $x$ is 0, 1 or 2, or an ester thereof.

4. An unsaturated polyester-amide resin condensation product as in claim 1 wherein said difunctional component (B) is an alkanolamine having an alkylene radical with from 2 to 10 carbon atoms and a primary amino group or a secondary amino group having an N-alkyl substituent with up to 4 carbon atoms.

5. An unsaturated polyester-amide resin condensation product as in claim 4 wherein said difunctional component (B) additionally comprises an aliphatic diamine, a dihydroxy alcohol, or a mixture thereof.

6. An unsaturated polyester-amide resin condensation product as in claim 1 wherein said difunctional component (B) is a mixture of an aliphatic diamine and a dihydroxy alcohol.

7. An unsaturated polyester-amide resin condensation product as in claim 1 wherein said difunctional component (B) is a mixture of a cycloaliphatic diamine and a dihydroxy alcohol.

8. A hardenable composition, hardening on the addition of a free radical-forming catalyst thereto, comprising an unsaturated polyester-amide resin condensation product as in claim 1 and, as a comonomer, an olefinically unsaturated compound polymerizable by free radical-forming materials.

9. An unsaturated polyester-amide resin condensation product as in claim 1, wherein said acid component (A) additionally comprises up to 40 equivalent percent, calculated on the total polycarboxylic acid content with the exception of the terminal maleic acid, of a short-chain saturated linear or branched aliphatic, cycloaliphatic, or aromatic dicarboxylic acid having 6 to 10 carbon atoms.

10. A hardenable composition, hardening on the addition of a free radical-forming catalyst thereto, comprising an unsaturated polyester-amide resin condensation product as in claim 9 and, as a comonomer, an olefinically unsaturated compound polymerizable by free radical-forming materials.

11. The method of making an unsaturated polyester-amide resin condensation product which comprises condensing, at an elevated temperature, (A) an acid component selected from the group consisting of (1) a polymeric fatty acid and esters thereof, (2) a high molecular weight branched polycarboxylic acid having at least 12 carbon atoms and esters thereof, and (3) mixtures of (1) and (2), with (B) a difunctional component having hydroxy and amino groups and selected from the group consisting of (1) an alkanolamine and (2) a mixture of an aliphatic or cycloaliphatic diamine and a dihydroxy alcohol, in which condensation product the ratio of equivalents of hydroxy and amino groups in said difunctional component to carboxyl groups in said acid component is between 1.2:1 and 2:1, and then adding maleic acid anhydride to any unreacted hydroxyl and amino groups in said condensation product.

12. The method as in claim 11 wherein said acid component (A) additionally comprises up to 40 equivalent percent, calculated on the total polycarboxylic acid content with the exception of the terminal maleic acid, of a short-chain saturated linear or branched aliphatic, cycloaliphatic, or aromatic dicarboxylic acid having 6 to 10 carbon atoms.

References Cited

UNITED STATES PATENTS

| 2,518,148 | 8/1950 | Jordan et al. | 260—18 |
| 2,638,449 | 5/1953 | White et al. | 260—18 |
| 2,706,191 | 4/1955 | Holmen | 260—75 |

(Other references on following page)

| | | |
|---|---|---|
| 3,127,365 | 3/1964 | Floyd _____ 260—23 |
| 3,383,391 | 5/1968 | Carlick et al. _____ 260—404.5 |

FOREIGN PATENTS

| | | |
|---|---|---|
| 572,463 | 6/1962 | Belgium. |
| 744,988 | 10/1966 | Canada. |
| 110,638 | 2/1961 | Pakistan. |

DONALD E. CZAJA, Primary Examiner

R. W. GRIFFIN, Assistant Examiner

U.S. Cl. X.R.

117—126, 161, 167; 161—231; 260—18, 31.2, 32.8, 33.2, 33.4, 33.6, 37, 40, 75, 78.4, 78.5, 861